Figure 1:
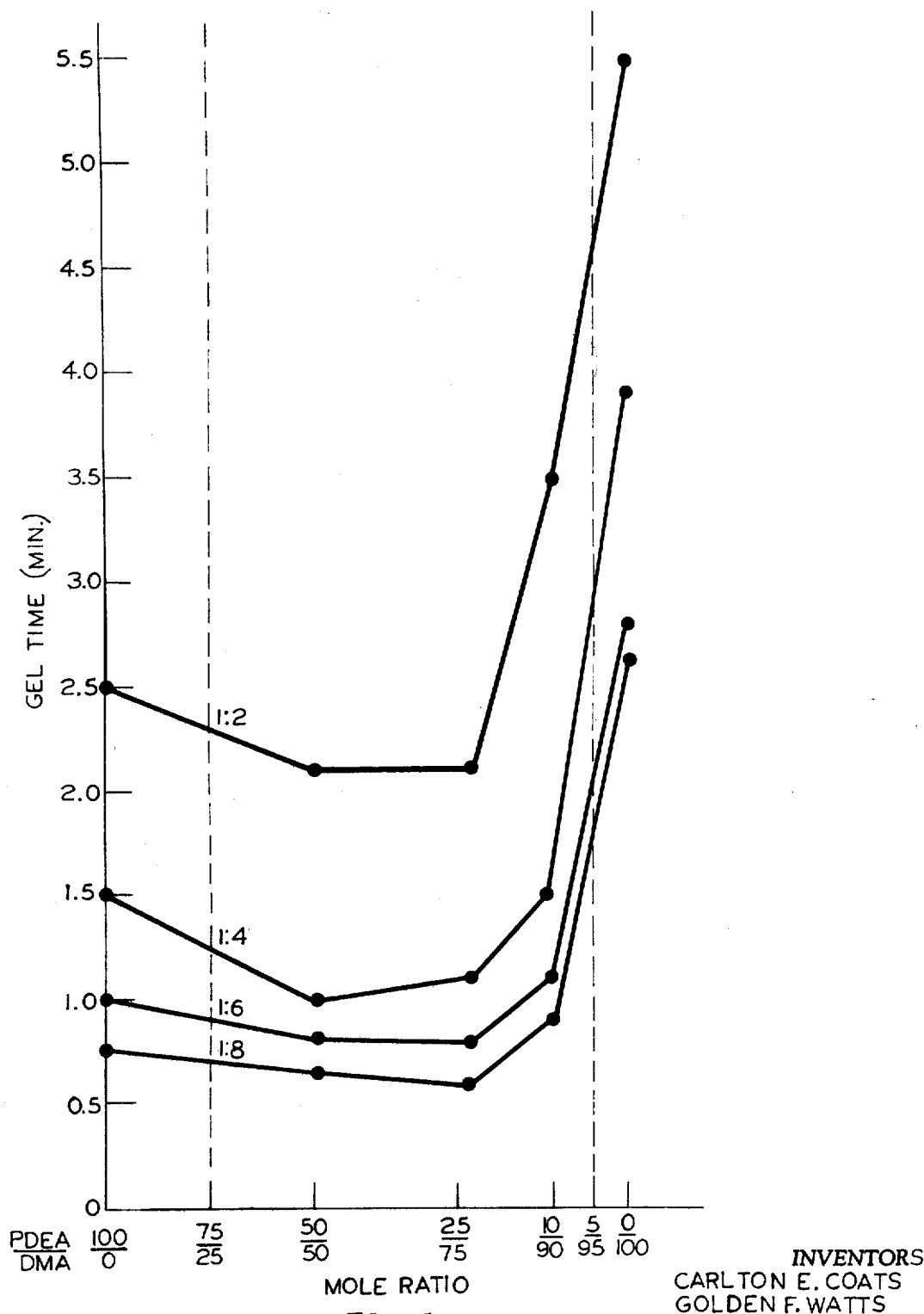

United States Patent [19]

Coats et al.

[11] 3,950,287
[45] Apr. 13, 1976

[54] PRODUCTION OF THERMOSET WATER-IN-OIL EMULSIONS

[75] Inventors: Carlton E. Coats, Burnsville; Golden F. Watts, Rosemount, both of Minn.

[73] Assignee: Ashland Oil, Inc., Ashland, Ky.

[22] Filed: Jan. 24, 1973

[21] Appl. No.: 326,363

Related U.S. Application Data

[63] Continuation of Ser. No. 110,856, Jan. 29, 1971, abandoned.

[52] U.S. Cl. .............. 260/22 CB; 260/29.6 NR; 260/29.6 MN; 260/29.6 MM; 260/29.7 NR; 260/29.7 N; 260/864; 260/868
[51] Int. Cl.² ......................................... C08L 67/06
[58] Field of Search 260/29.6 NR, 29.6 R, 29.6 MM, 260/29.6 MN, 864, 22 CB

[56] References Cited
UNITED STATES PATENTS

| | | | |
|---|---|---|---|
| 3,236,915 | 2/1966 | Zanaboni | 260/864 |
| 3,256,219 | 6/1966 | Will | 260/29.6 NR |
| 3,367,994 | 2/1968 | Parker et al. | 260/864 |
| 3,442,842 | 5/1969 | Von Bonin | 260/29.6 NR |
| 3,629,169 | 12/1971 | Bedighian | 260/22 CB |

*Primary Examiner*—Harold D. Anderson

[57] ABSTRACT

Water-in-oil emulsions containing ethylenically unsaturated compound(s) are converted to thermoset form by polymerization of said compound(s) with the aid of a mixture and amines which includes N-hydroxyalkyl substituted, phenyl-substituted tertiary amine compounds, oil soluble cobalt salt(s) and peroxy free radical catalyst(s).

30 Claims, 2 Drawing Figures

PRODUCTION OF THERMOSET WATER-IN-OIL EMULSIONS

This is a continuation of application Ser. No. 110,856 filed Jan. 29, 1971 and now abandoned.

BRIEF DESCRIPTION OF THE INVENTION

The method of the present invention pertains to the art of curing polymerizable water-in-oil emulsions in which at least a major weight portion of the oil phase is one or more ethylenically unsaturated compounds susceptible to free radical induced polymerization. In accordance with the invention, such an emulsion is converted to thermoset form with a combination of amine compounds, wherein at least one of the amine compounds in said combination has at least one hydroxyalkyl group connected to the amino nitrogen as in the following formula:

(A) 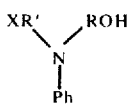

wherein X is a hydroxyl group or hydrogen, R and R' are identical or different divalent saturated aliphatic hydrocarbon groups having 1–6 carbon atoms and Ph is phenyl; and wherein, at least one other of the amine compounds in said combination has the following formula:

(B) 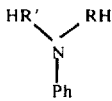

wherein H is hydrogen and R', R and Ph have the definitions given above; and wherein the ratio of the number of molecules of A to the number of molecules of B (molar ratio, A to B) is at least about 0.05 and not more than about 3. At least one oil soluble cobalt salt(s) and at least one organic and/or inorganic peroxy free radical generating catalyst compound(s) are also included in the emulsion. Altogether, the weight of the combination of amines, cobalt (metal) and peroxy catalyst is 0.25–10% and preferably 0.5–3% by weight, based on the polymerizeable ingredients of the emulsion. The optimum amounts of peroxy catalyst and cobalt for solidifying the polymerizeable portion of the oil phase are readily determinable by those skilled in the art. However, for each mole of cobalt, about 1 to 10 coordination equivalents (total) of the amines are employed.

With the combination of amines, gel times and cure rates are obtained which are faster than would be expected from the proportional additive effects of these amines. Thus, the invention provides a way of more rapidly converting polymerizeable water-in-oil emulsions to thermoset form, paving the way for faster demolding and higher production rates in rapid mass production molding operations.

DISCUSSION

Water-in-oil emulsions have an aqueous phase, which is water or an aqueous solution, and an oil phase which is basically one or more liquid organic compounds that are immiscible with the aqueous phase. In such emulsions, a multitude of tiny droplets of aqueous phase are distributed uniformly throughout the oil phase, which surrounds them. Accordingly, the oil and aqueous phases are referred to as the continuous and discontinuous phases, respectively.

In order to provide the requisite degree of stability, the droplets of aqueous phase should have a diameter less than 50 microns and preferably predominately less than 10 microns. Emulsions of the type used in the present invention have sufficient stability to resist breaking on polymerization of the polymerizable portion of the oil phase, at least until such time as the emulsion has sufficiently solidified to prevent major redistribution of the water. Thus, the water-in-oil emulsions employed in the present invention are to be distinguished from conditionally stable mechanical dispersions in which the water droplets for the most part coalesce into large drops prior to or during polymerization. For further information on the applicable water-in-oil emulsions, reference is made to U.S. Pat. No. 3,256,219 to Guenther Will.

Both polymerizable and nonpolymerizable materials may be present in the oil phase. By way of example and not limitation, it may be mentioned that the oil phase can include nonpolymerizable plasticizers for softening the resinous matrix of the finished thermoset emulsion, polymeric and nonpolymeric emulsifiers for assisting in the formation and/or retention of the emulsion, and organic dyestuffs. However, at least the major portion of the oil phase on a weight basis is one or more ethylenically unsaturated compound(s). Embraced within the meaning of the term "compound" are low molecular weight compounds such as monomers, as well as medium and high molecular compounds such as prepolymers and polymers. The ethylenically unsaturated compounds may be used alone or in any desired interpolymerizable combination. However, the thermoset emulsions which presently appear to be of most significant commercial interest are those prepared from water-in-oil emulsions in which the oil phase is composed entirely, or at least to the extent of about 50% by weight, of a mixture of unsaturated polyester resin and styrene. It should be understood also that the ethylenically unsaturated compounds, whether of low or high molecular weight, are not limited in respect to the number of ethylenically unsaturated groups which they may contain. By selecting ethylenically unsaturated compounds and mixtures thereof having differing degrees of unsaturation, it is possible to vary the rigidity, heat distortion temperature, flexibility and other properties of the final product, and those skilled in the art are well educated in the criteria for making such selections.

The emulsion is converted to thermoset form, without breaking same, by polymerizing the ethylenically unsaturated compound(s) in the oil phase, thus transforming the latter to solid form. This process is referred to as "curing". In curing of emulsions, various stages may be observed. There is normally an initial period during which the emulsion, through beginning to polymerize, is still "mobile"; that is, it may be stirred. Gellation follows; that is, the emulsion becomes immobile. This change often occurs abruptly, sometimes gradually. Stirring and pouring are no longer possible after gellation. However, the physical properties of the gelled material, especially tensile strength and dimensional stability, normally fall far short of the ultimate capabilities of the raw materials. The properties develop during a continuation of the polymerization subsequent to gellation is marked by a rising temperature in the emulsion due to the exothermic nature of the polymerization. After the temperature reaches a maximum, referred to as "peak exotherm", and the thermoset emulsion has cooled, physical testing normally discloses tensile and dimensional properties far exceeding those of the gelled material.

When the emulsions are employed in making shaped objects, as is often the case, the polymerization normally takes place with the emulsion in contact with a shaping member, e.g., a quantity of emulsion is polymerized in a mold. Production capacity with a given number of molds is influenced by the time consumed in the polymerization, and various terms are employed to identify the elapsed time in the various stages of polymerization mentioned above. Thus, "gel time" or GT, refers to the time elapsed between commencement of polymerization and gellation of the emulsion. The instant when gellation has occurred normally can readily be determined manually by repeatedly and gently dipping a probe, e.g., a stirrer or tongue depressor, into the polymerizing emulsion. When the emulsion resists penetration by the probe, it has gelled. When the gellation occurs gradually, commercially available gel time measuring devices may prove useful. The elapsed time from the moment of gellation to "peak exotherm" is referred to as "gel to peak exotherm" or GPE. The "total cure time" or CT is the sum of the GT and GPE. With the object of obtaining a sufficiently high volume of production from a given number of molds, catalysts and promoters have been incorporated in the emulsions to speed up the polymerization, correspondingly reducing the time each object must stay in its mold. A widely used combination of catalyst and promoters is a free-radical generating peroxy or hydroperoxy compound, a cobalt salt and an alkyl aromatic amine. For convenience in measuring the gel time with catalysts and promoters, the gel time is generally measured from the time their addition is completed.

Through the present invention, it has been discovered that the effectiveness of such a combination of catalyst and promoters is enhanced when it includes a mixture of specified alkyl aromatic amine compounds in which at least one of the amine compounds has at least one hydroxyalkyl group connected to the amino nitrogen. The non-obviousness of the invention is evidenced in part by the fact that the advantages of jointly employing the specified amines in aqueous systems have not previously been recognized, notwithstanding the fact that the use of the hydroxyalkyl substituted amines as promoters in non-aqueous systems has been known for at least several years. In general the amines are tertiary amines which include phenyl substitution. Because of their structure, these amines apparently hold the unshared pair of electrons on the nitrogen atom of the amine sufficiently loosely for making said electrons available for coordinating with cobalt and/or for entering into free radical reactions. Accordingly, amines which contain substituted phenyl groups which permit the unshared electrons to coordinate or react in the above-described manner are considered to be the equivalent of those amines which have an unsubstituted phenyl group. Indeed, substitution in the phenyl group may enhance the activity of the amine, as in the case of a methyl group located meta to the carbon atom of the N-phenyl bond. By way of example and not limitation, other groups such as alkoxy (e.g. methoxy) and halogen (e.g. chloro and fluoro) are also useful substituents for inclusion in the phenyl group. Thus, for purposes of the present specification and claims, the term phenyl should be interpreted as including substituted phenyl.

Although there is no intention of being bound by such theory, experimentation with the invention suggests that the —OH group(s) of the hydroxyalkyl substituted amines also coordinate(s) with cobalt, which is advantageous in enhancing the effectiveness of the catalyst-promoter system in effecting rapid gellation of the emulsions. In line with this observation, it is preferred that in the compound of formula A, the group X should be —OH. Thus, depending on whether X is —OH or not, the compound A may have 3 or 2 coordination sites, respectively. The compound B has a coordination site at the amino nitrogen, as indicated above. For purposes of the present invention, the coordination equivalent weight of the amine compounds A and B is determined by dividing their molecular weight by the number of coordination sites referred to in the foregoing discussion. The number of coordination equivalents of amines is obtained by separately dividing the weight of each amine by its coordination equivalent weight and summing the quotients.

The groups R and R' in formulae A and B may have from one to six carbon atoms. The preferred range is one to four carbon atoms, with two being most preferred, e.g., as in phenyldiethanolamine, phenyl-ethylethanolamine and m-tolyl-diethanolamine Other hydroxalkyl amines falling within the general formula A are:

N-methyl-N-hydroxyethyl-m-methylaniline
N-ethyl-N-hydroxyethyl-m-methylaniline
N-propyl-N-hydroxyethyl-m-methylaniline
N-butyl-N-hydroxyethyl-m-methylaniline
N-hexyl-N-hydroxyethyl-m-methylaniline
N-ethyl-N-hydroxyethyl-o-methylaniline
N-ethyl-N-hydroxyethyl-p-methylaniline
N-ethyl-N-hydroxyhexyl-m-ethylaniline
N-propyl-N-hydroxyethyl-o-ethylaniline
N-butyl-N-hydroxyethyl-p-ethylaniline
N-methyl-N-hydroxypropyl-m-ethylaniline
N-butyl-N-hydroxybutyl-m-butylaniline
N-propyl-N-hydroxybutyl-p-butylaniline Further information on such amines and their use in essentially nonaqueous systems may be found in U.S. Pat. No. 3,367,994 and Kodak Eastman Chemicals Technical Data Publication TDS No. D-129.

The amines of formula B are known promoters for curing polyester resins. Various examples of these amines are commercially available, or have been described in the literature, including: dimethyl aniline, N,N-diethyl aniline, N,n-dimethyl-p-toluidine, and N-ethyl-m-toluidine. Dimethyl aniline, sometimes referred to as DMA, is preferred on account of its ready availability, economy and effectiveness, and has previously been used with cobalt and peroxy catalysts in curing water-in-oil emulsions. There is experimental evidence that in non-aqueous systems, a group B amine such as DMA is more effective than a hydroxyalkyl substituted amine of Group A. Therefore, the herein-described performance of the combination of the group A and B amines in the aqueous environment was quite surprising. This is made clear in the examples which follow. Various combinations or mixtures of the amines of groups A and B may be used. Thus, one may use a plurality of amines from one group and one or a plurality of amines from the other group. Amine promoters other than, those of groups A and B may also be included in the combinations or mixtures if desired, it being preferred, however, that the group A and B compounds constitute the major portion of the total weight of all amine promoters used.

Cobalt ions dissolved in the oil phase cooperate with the aforesaid amines in promoting the peroxy catalysts described hereinafter. The ions are most conveniently made available to the site of polymerization in the form of oil soluble organic salts of carboxylic acids. As the literature (Oleesky and Mohr, SPI Handbood of Reinforced Plastics, Reinhold, 1964, p. 48) teaches that one type of salt (e.g. cobalt linoleate) exhibits no advantage as a promoter over another type of salt (e.g., cobalt naphathenate), the identity of the organic moiety is not deemed critical. Examples of suitable cobalt salts are those mentioned above, as well as the neodecanate, tallate, stearate and octoate, the neodecanate and octoate being preferred on account of their relatively high weight percent of metal content as compared to salts of higher acids, e.g., those of up to 24 carbon atoms.

The peroxy catalysts to be employed in the present invention are well known to those skilled in the art. They include organic or inorganic peroxide or hydroperoxide catalysts or mixtures thereof. Some representative catalysts include hydrogen peroxide, methylethylketone peroxide, 2,4 pentane dione peroxide or combinations of it with ditert-butyl peroxide, cyclohexanone peroxide, polymeric ketone peroxides, lauroyl peroxide, cumene hydroperoxide, di-cumyl peroxide, diethyl peroxide, di-tert-amyl peroxide, cyclohexyl hydroperoxide and mixtures of any of the peroxy catalysts. The preferred catalysts are hydrogen peroxide, methylethylketone peroxide, and cyclohexyl peroxide.

The ethylenically unsaturated polyester employed in the preferred oil phase of the present invention can be produced by reacting a polycarboxylic acid and a polyhydric alcohol (or the anhydride of either or both of the foregoing) at the esterification temperatures, generally at least 150°C, until the acid value and the hydroxyl value of the reaction mixture has been reduced to values corresponding to a mean weight average molecular weight in the range of about 1000 to about 10,000. The polyesters useful in the present invention can be random polyesters produced by simultaneous addition of total quantities of all reactants or block polyesters produced by sequential addition of one or more reactants such as the saturated and unsaturated polycarboxylic acids. The polyester can be one or more $\alpha,\beta$-ethylenically unsaturated polyester of an $\alpha\beta$-ethylenically unsaturated polycarboxylic acid and/or anhydride thereof; and polyhydric alcohol and/or alkylene oxide.

The polyhydric alcohols which can be reacted with the polycarboxylic acids in order to give polyesters useful in the present invention are preferably the dihydric alcohols, examples of which include, among others, ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, and 1,5-pentaneidol. Higher polyhydric alcohols such as trimethylol propane and pentaery-thritol can be used in minor amounts of up to 5% by weight.

The polycarboxylic acid which can be employed to produce the unsaturated polyesters useful in the present invention generally have 3 to 36 and preferably 4 to 8 carbon atoms. Unsaturated acids are used to impart the desired unsaturation to the polyesters, but saturated acids (including acids with unreactive unsaturated bonds) are used to vary the degree of unsaturation and therefore the cross-linking density of the polyesters in a manner known to those skilled in the art. Examples of suitable unsaturated acids include aliphatic acids such as fumaric acid, maleic acid, itaconic acid and their anhydrides. Suitable saturated acids include, among others, oxalic acid, malonic acid, adipic acid, succinic acid, glutaric acid, sebacic, azelaic acid and dimers of $C_{12}$ and $C_{18}$ acids. Phthalic, isophthalic and terephthalic acids behave like saturated acids and are preferred "saturated acids" in accordance with the invention because they can impart desirable physical characteristics such as compressive and tensile strength and impact resistance to the cured emulsion. Halogenated acids such as tetrachlorophthalic acid, tetrabromophthalic acid, and chlorendic acid (1,4,5,6,7,7-hexachloro-5-norbornene-2,3-dicarboxylic acid) can also be employed. Higher polycarboxylic acids such as trimellitic anhydride may be employed in small amounts, e.g., up to 5% by weight in combination with dicarboxylic acids. Saturated monobasic acids may also be present in the polyesters, such as for capping purposes. Thus, for example, benzoic acid, 2-ethyl hexoic and up to $C_{24}$ saturated fatty acids may be included. However, in a preferred embodiment, the polyesters consist essentially of dicarboxylic acids as the major weight portion of the total acid components.

The relative proportions of unsaturated and saturated acids are such as to provide the resultant polyester with ethylenic unsaturation capable of reacting with a copolymerizable solvent. It is necessary that the unsaturation of the polyester be alpha, beta-ethylenic unsaturation. Generally the molar ratio of unsaturated acids to saturated acid is from 1:0 to 1:5. The molar ratio of polycarboxylic acid to polyhydric alcohol is generally from 10:8 to 8:10, although stoichiometric ratios or those having up to 10 to 20 mole % excess polyhydric alcohol can also be employed.

Solvents which are useful in forming the oil phase of the water-in-oil emulsions used in the present invention are those which are copolymerizable with the ethylenically unsaturated polyester and which will dissolve the polyester. Examples of these solvents include vinyl toluene, alpha-methyl styrene, acrylonitrile, ethylacrylate, methylacrylate, methylmethacrylate, vinylacetate, trialkylcyanurate, diallyphthalate, methylvinylether, and ethylvinylether. Styrene is the preferred solvent because of its cost, availability and reactivity. For purposes of the present specification and claims, "styrene" includes any of the styrenes and mixtures of ethylenically unsaturated monomers in which one or more styrenes represent the major weight portion of such mixtures. The copolymerizable solvent is employed with the unsaturated polyester in weight ratios of about 10:1 to about 1:10 and preferably about 1:2 to about 2:1.

The discontinuous aqueous phase can be water per se or it can contain up to 75% or preferably up to 25% by weight of other additives which are soluble in the water. Examples of such additives are alcohols, in particular lower monohydric aliphatic alcohols such as methanol, ethanol, and n- and iso-propanol, and n-, iso, and tertiary butanol; lower ethers and lower ketones such as methylethylether and dimethyl ketone; inorganic salts such as sodium chloride, potassium sulfate, sodium sulfate, magnesium sulfate and magnesium chloride. In addition the aqueous dispersed phase can contain various organic liquids with a high dielectric constant such as formamide and dimethylformamide, or carbohydrates such as saccharose, glucose, and fructose. Generally, the weight ratio of aqueous phase to oil phase is in the range of about 1:3 to 9:1 and preferably about 4:6 to about 7:3.

centages of catalyst solution, total DMA plus PDEA, and cobalt liquid preparation (all based on resin solution), the mole percentages of PDEA and DMA (based on total moles of PDEA and DMA), the ratio of moles of cobalt to total coordination equivalents of PDEA and DMA, as well as the gel time, gel to peak exotherm time and peak exotherm for each batch are shown in the following table:

| RUNS CONDUCTED AT ROOM TEMPERATURE (E.G. 20-30°C) WITHOUT APPLICATION OF EXTERNAL HEAT | | | | | | | | |
|---|---|---|---|---|---|---|---|---|
| Catalyst Solution (%) | Total PDEA + DMA (%) | Mole % PDEA | Mole % DMA | Cobalt Preparation | Coordination Ratio Co:Amines | Gel Time (Min.) | Gel to Peak Exotherm (Min.) | Peak Exotherm (°F) |
| 0.5 | 0.25 | 100 | 0 | 1% | 1:2 | 2.5 | 26.0 | 172 |
| " | 0.312 | 50 | 50 | " | 1:2 | 2.1 | 18.0 | 202 |
| " | 0.375 | 25 | 75 | " | 1:2 | 2.1 | 13.0 | 205 |
| " | 0.437 | 10 | 90 | " | 1:2 | 3.5 | 15.0 | 205 |
| " | 0.5 | 0 | 100 | " | 1:2 | 5.5 | 16.0 | 204 |
| 0.75 | .50 | 100 | 0 | " | 1:4 | 1.5 | 14.3 | 207 |
| " | .625 | 50 | 50 | " | 1:4 | 1.0 | 10.0 | 212 |
| " | 0.75 | 25 | 75 | " | 1:4 | 1.1 | 9.0 | 216 |
| " | .875 | 10 | 90 | " | 1:4 | 1.5 | 10.0 | 217 |
| " | 1.0 | 0 | 100 | " | 1:4 | 3.9 | 12.0 | 215 |
| 1.0 | .75 | 100 | 0 | " | 1:6 | 1.0 | 10.0 | 214 |
| " | .935 | 50 | 50 | " | 1:6 | 0.8 | 8.2 | 216 |
| " | 1.125 | 25 | 75 | " | 1:6 | 0.8 | 8.0 | 218 |
| " | 1.312 | 10 | 90 | " | 1:6 | 1.1 | 8.6 | 218 |
| " | 1.5 | 0 | 100 | " | 1:6 | 2.8 | 8.7 | 213 |
| 1.25 | 1.0 | 100 | 0 | " | 1:8 | 0.75 | 8.6 | 217 |
| " | 1.25 | 50 | 50 | " | 1:8 | 0.65 | 8.3 | 217 |
| " | 1.50 | 25 | 75 | " | 1:8 | 0.6 | 7.4 | 217 |
| " | 1.75 | 10 | 90 | " | 1:8 | 0.9 | 8.1 | 216 |
| " | 2.0 | 0 | 100 | " | 1:8 | 2.6 | 9.0 | 215 |

EXAMPLES

In the following examples which are given to illustrate rather than restrict the invention, all parts and percentages are by weight except as indicated.

A quantity of resin solution is formed from 65 parts of styrene, 21 parts of polyester of maleic acid, isophthalic acid and propylene glycol in a molar ratio of 1:1:2, having acid and hydroxyl values of 8–12 and 15–30 respectively; and 14 parts of polyester of maleic acid, adipic acid and diethylene glycol in a molar ratio of 1:3:4, having acid and hydroxyl values of 8–12 and 10–25 respectively. Each of the foregoing resins is inhibited with 100 ppm of tertiary butyl catechol.

To a batch of resin solution are added (while agitation continues) predetermined quantities of cobalt neodecanate, dimethyl aniline (DMA) and phenyl diethanol amine (PDEA). The cobalt neodecanate is added in the form of a liquid preparation containing 12% cobalt as metal. The DMA is added in the form of liquid (100% purity) and the PDEA is added in the form of a 50% solution in Solox solvent.

Figure 2:
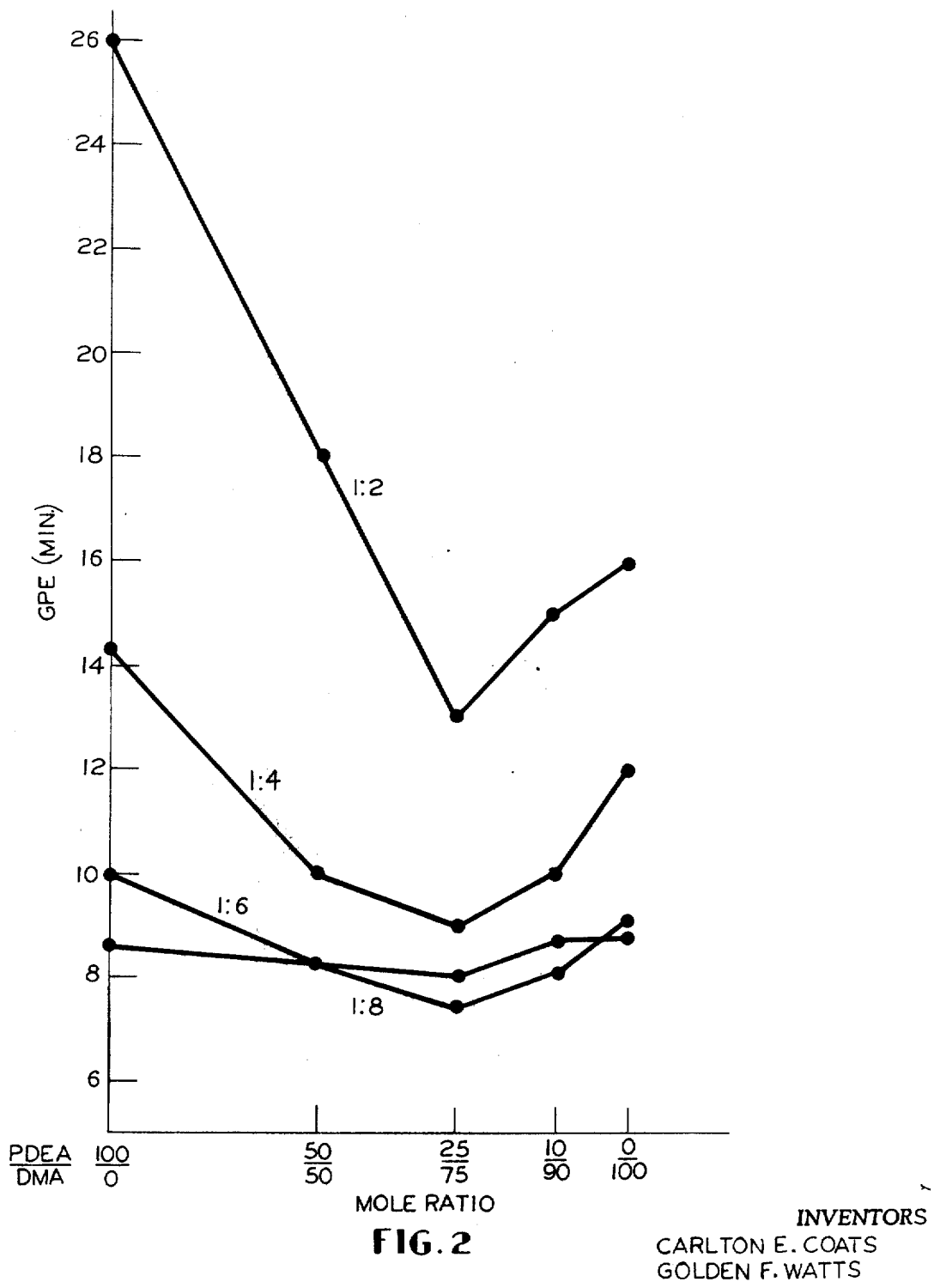

Into the vortex formed in the solution by the rapidly turning agitation is gradually poured 100 parts of water to form a water-in-oil emulsion. The agitated emulsion is catalyzed by adding a predetermined quantity of a 35% aqueous solution of hydrogen peroxide. The gellation of the batch is timed from the moment of addition of the catalyst. Gellation is judged to have occured when the emulsion resists penetration by a tongue depressor. Gel to peak exotherm is measured with a thermocouple and moving chart recorder. The thermocouple is inserted in the batch prior to gellation and the chart is manually marked or started at the instant of gellation so that the GPE time from gellation to peak recorded temperature may be determined. The per- The gel time and get to peak exotherm results of the foregoing runs were plotted and appear in FIGS. 1 and 2, respectively. Reference to FIG. 1 will show that when the amine of formula A and the amine of formula B are used in combination, the gel time is significantly less than would have been expected based on the proportions used and the gel times observed when the same amines are used individually. Likewise, reeference to FIG. 2 will show that when the amines of formulas A and B are used together, the gel to peak exotherm time is significantly less than would have been expected based on the proportions used and the gel times observed when the same amines are used individually. Within the preferred range of coordination ratios, e.g., about 1:3 to about 1:8, moles of cobalt to condination equivalents of amines, and the preferred range of molar ratios of amines, e.g., wherein the ratio of A:B is greater than about 0.1 and less than about 3, it is possible to obtain both faster gel times or faster gel to peak exotherm times or both than can be obtained with either the formula A or the formula B amine alone. The faster gellation and curing thus obtained facilitate rapid mass production of molded parts by permitting a shorter molding cycle.

What is claimed is:

1. A method of curing polymerizable water-in-oil emulsions in which at least a major weight portion of the oil phase is one or more $\alpha,\beta$-ethylenically unsaturated polyester resin of a member selected from the group consisting of $\alpha,\beta$-ethylenically unsaturated polycarboxylic acid, anhydride thereof, and mixtures thereof; and a member selected from the group consisting of polyhydric alcohol, alkylene oxide, and mixtures thereof; and is susceptible to free radical induced polymerization and copolymerizable ethylenically unsaturated compounds susceptible to free radical induced polymerization wherein said emulsion contains and is polymerized to thermoset form with the aid of a combination of amine compounds, wherein at least one of the amine compounds in said combination has at least one hydroxy alkyl group connected to the amino nitrogen and has the following formula:

(A) 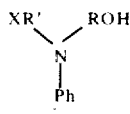

wherein X is a hydroxy group, R and R' are identical or different divalent saturated aliphatic hydrocarbon groups having 1–6 carbon atoms and Ph is phenyl; and wherein at least one other of the amine compounds in said combination has the following formula:

(B) 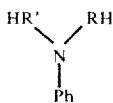

wherein H is hydrogen and R', R and Ph have the definitions given above; and wherein the molar ratio of A to B is at least about 0.5 and not more than about 3, said emulsion also contains and also is polymerized with the aid of at least one peroxy free radical generating catalyst compound, and at least one oil soluble cobalt salt of organic carboxylic acid promoter, the weight of said combination of amines, cobalt salt promoter and peroxy catalyst is equal to about 0.25 to about 10% by weight, based on the polymerizable ingredients of the emulsion, and wherein for each mole of cobalt as metal, about 1 to 10 coordination equivalents of the aforesaid amines are employed.

2. The method of claim 1 wherein said coordination ratio is about 1:3 to about 1:8.

3. The method of claim 1 wherein R and R' in formulas (A) and (B) are identical or different divalent saturated aliphatic hydrocarbon groups having 1 to 4 carbon atoms.

4. The method of claim 1 wherein R and/or R' in formulas (A) and (B) has two carbon atoms.

5. A method of curing polymerizable water-in-oil emulsions in which at least a major weight portion of the oil phase is one or more α,β-ethylenically unsaturated polyester resin of a member selected from the group consisting of α,β-ethylenically unsaturated polycarboxylic acid, anhydride thereof, and mixtures thereof; and a member selected from the group consisting of polyhydric alcohol, alkylene oxide, and mixtures thereof; and is susceptible to free radical induced polymerization and copolymerizable ethylenically unsaturated compounds susceptible to free radical induced polymerization wherein said emulsion contains and is polymerized to thermoset form with the aid of a combination of amine compounds, wherein at least one of the amine compounds in said combination is (A) selected from the group consisting of phenyldiethanolamine and m-tolyl diethanolamine; and wherein at least one other of the amine compounds in said combination has the following formula:

(B) 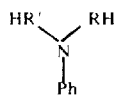

wherein H is hydrogen, R and R' are identical or different divalent saturated aliphatic hydrocarbon groups having 1–6 carbon atoms and Ph is phenyl; and wherein the molar ratio of A to B is at least about 0.5 and not more than about 3, said emulsion also contains and also is polymerized with the aid of at least one peroxy free radical generating catalyst compound, and at least one oil soluble cobalt salt of organic carboxylic acid promoter, the weight of said combination of amines, cobalt salt promoter and peroxy catalyst is equal to about 0.25 to about 10% by weight, based on the polymerizable ingredients of the emulsion, and wherein for each mole of cobalt as metal, about 1 to 10 coordination equivalents of the aforesaid amines are employed.

6. A method of curing polymerizable water-in-oil emulsions in which at least a major weight portion of the oil phase is one or more α,β-ethylenically unsaturated polyester resin of a member selected from the group consisting of α,β-ethylenically unsaturated polycarboxylic acid, anhydride thereof, and mixtures thereof; and a member selected from the group consisting of polyhydric alcohol, alkylene oxide, and mixtures thereof; and is susceptible to free radical induced polymerization and copolymerizable ethylenically unsaturated compounds susceptible to free radical induced polymerization wherein said emulsion contains and is polymerized to thermoset form with the aid of a combination of amine compounds, wherein at least one of the amine compounds in said combination has at least one hydroxy alkyl group connected to the amino nitrogen and has the following formula:

(A) 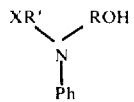

wherein X is a hydroxy group, R and R' are identical or different divalent saturated aliphatic hydrocarbon groups having 1–6 carbon atoms and Ph is phenyl; and wherein at least one other of the amine compounds in said combination is (B) selected from the group consisting of dimethylaniline, N,N-diethylaniline, N,N-dimethyl-p-toluidine, and N-ethyl-m-toluidine; and wherein the molar ratio of A to B is at least about 0.5 and not more than about 3, said emulsion also contains and also is polymerized with the aid of at least one peroxy free radical generating catalyst compound, and at least one oil soluble cobalt salt of organic carboxylic acid promoter, the weight of said combination of amines, cobalt salt promoter and peroxy catalyst is equal to about 0.25 to about 10% by weight, based on the polymerizable ingredients of the emulsion, and wherein for each mole of cobalt as metal, about 1 to 10 coordination equivalents of the aforesaid amines are employed.

7. A method of curing polymerizable water-in-oil emulsions in which at least a major weight portion of the oil phase is one or more α,β-ethylenically unsaturated polyester resin of a member selected from the group consisting of α,β-ethylenically unsaturated polycarboxylic acid, anhydride thereof, and mixtures thereof; and a member selected from the group consisting of polyhydric alcohol, alkylene oxide, and mixtures thereof; and is susceptible to free radical induced polymerization and copolymerizable ethylenically unsaturated compounds susceptible to free radical induced polymerization wherein said emulsion contains and is polymerized to thermoset form with the aid of a combination of amine compounds, wherein at least one of the amine compounds in said combination is (A) selected from the group consisting of phenyldiethanolamine and m-tolyl diethanolamine; and wherein at least one other of the amine compounds in said combination is (B) selected from the group consisting of dimethylaniline, N,N-diethylaniline, N,N-dimethyl-p-toluidine and N-ethyl-m-toluidine; and wherein the molar ratio of A to B is at least about 0.5 and not more than about 3, said emulsion also contains and also is polymerized with the aid of at least one peroxy free radical generating catalyst compound, and at least one oil soluble cobalt salt of organic carboxylic acid promoter, the weight of said combination of amines, cobalt salt promoter and peroxy catalyst is equal to about 0.25 to about 10% by weight, based on the polymerizable ingredients of the emulsion, and wherein for each mole of cobalt as metal, about 1 to 10 coordination equivalents of the aforesaid amines are employed.

8. The method of claim 1 wherein said cobalt salt is selected from the group consisting of cobalt neodecanate, cobalt neodecanate, cobalt tallate, cobalt stearate, cobalt octoate, cobalt linoleate, and cobalt naphthenate.

9. The method of claim 1 wherein said cobalt is selected from the group consisting of cobalt neodecanate and cobalt octoate.

10. The method of claim 1 wherein the peroxy catalyst is selected from the group consisting of hydrogen peroxide, methylethylketone peroxide, 2,4-pentane dione peroxide, combinations of 2,4-pentane dione peroxide and di-tert.butyl peroxide, cyclohexanone peroxide, polymeric ketone peroxides, lauroyl peroxide, cumene hydroperoxide, dicumyl peroxide, diethyl peroxide, di-tert.amyl peroxide, cyclohexyl hydroperoxide, and mixtures thereof.

11. The method of claim 1 wherein said peroxy catalyst is selected from the group consisting of hydrogen peroxide, methylethylketone peroxide, and cyclohexyl peroxide.

12. The method of claim 1 wherein said ethylenically unsaturated polyester is an ethylenically unsaturated polyester of an α,β-ethylenically unsaturated dicarboxylic acid or anhydride thereof or mixtures thereof, and a glycol.

13. The method of claim 12 wherein the mole ratio of said dicarboxylic acid to said glycol is from 10:8 to 8:10.

14. The method of claim 12 wherein said acid has from 3 to 36 carbon atoms.

15. The method of claim 12 wherein said acid has from 4 to 8 carbon atoms.

16. The method of claim 12 wherein said ethylenically unsaturated polyester is an ethylenically unsaturated polyester of an α,β-ethylenically unsaturated dicarboxylic acid or anhydride thereof, and an acid selected from the group consisting of phthalic acid, isophthalic acid and terephthalic acid, and a glycol.

17. The method of claim 16 wherein said acid or anhydride thereof is selected from the group consisting of fumaric acid, maleic acid, itaconic acid and their anhydrides.

18. The method of claim 12 wherein said acid or anhydride thereof is selected from the group consisting of fumaric acid, maleic acid, itaconic acid, and their anhydrides.

19. The method of claim 12 wherein said glycol is selected from the group consisting of ethylene glycol diethylene glycol, 1,2-propylene glycol, 1,2-dipropylene glycol, 1,3-dipropylene glycol, 1,3-propylene glycol, 1,3-butylene glycol, 1,2-butylene glycol, neopentyl gylcol, 1,3-pentane diol, and 1,5-pentane diol.

20. The method of claim 1 wherein the copolymerizable ethylenically unsaturated compound is selected from the group consisting of vinyl toluene, α-methyl styrene, acrylonitrile, ethylacrylate, methylacrylate, methylmethacrylate, vinylacetate, triallylcyanurate, diallylphthalate, methylvinylether, and ethylvinylether.

21. The method of claim 1 wherein the weight ratio of the copolymerizable ethylenically unsaturated compound to the unsaturated polyester is about 10:1 to 1:10.

22. The method of claim 1 wherein the weight ratio of the copolymerizable ethylenically unsaturated compound to the unsaturated polyester is about 1:2 to about 2:1.

23. The method of claim 1 wherein the weight ratio of the aqueous phase to the oil phase is about 1:3 to 9:1.

24. The method of claim 1 wherein the weight ratio of the aqueous phase to oil phase is in the range of about 4:6 to about 7:3.

25. The method of claim 1 wherein amine of formula (A) is phenyl diethanol amine.

26. The method of claim 25 wherein the amine of formula (B) is dimethyl aniline.

27. The method of claim 1 wherein the amine of formula (B) is dimethyl aniline.

28. The method of claim 1 wherein the weight of said combination of amines, cobalt promoter, and peroxy catalyst is equal to 0.5–3% by weight.

29. The method of claim 1 wherein at least a major portion of the oil phase of said emulsion is styrene and a polyester resin.

30. The method of claim 1 wherein the polyester resin has a mean weight average molecular weight in the range of about 1,000 to about 10,000 as determined by the acid and hydroxyl values of the reaction mixture employed to prepare the polyester.

* * * * *